United States Patent
Hendrix et al.

(10) Patent No.: US 6,194,107 B1
(45) Date of Patent: Feb. 27, 2001

(54) METHOD FOR PRODUCING A SET OF EXPOSED PHOTOGRAPHIC COLOUR NEGATIVES AND THE USE OF SAID SET OF NEGATIVES IN A METHOD FOR CALIBRATING A DEVELOPING AND A PRINTING MACHINE SYSTEM FOR MAKING PHOTOGRAPHIC COLOUR PRINTS

(75) Inventors: H. G. M. Hendrix, Tilburg; P. J. A. M. Sparidaens, Goirle, both of (NL)

(73) Assignee: Fuji Photo Film B.V., Tilburg (NL)

( * ) Notice: Subject to any disclaimer, the term of this patent is extended or adjusted under 35 U.S.C. 154(b) by 0 days.

(21) Appl. No.: 09/185,340

(22) Filed: Nov. 3, 1998

(30) Foreign Application Priority Data

Nov. 4, 1997 (NL) .................................................. 1007441

(51) Int. Cl.[7] ...................................................... G03C 7/18
(52) U.S. Cl. ........................... 430/30; 430/359; 430/362
(58) Field of Search ................................ 430/30, 359, 362

(56) References Cited

U.S. PATENT DOCUMENTS

| | | | |
|---|---|---|---|
| 3,482,914 | 12/1969 | Misener | 355/36 |
| 4,611,918 | * 9/1986 | Nishida et al. | 356/404 |
| 4,977,521 | 12/1990 | Kaplan | 364/525 |
| 5,218,434 | * 6/1993 | Vinck | 358/518 |
| 5,563,717 | 10/1996 | Koeng et al. | 358/406 |

FOREIGN PATENT DOCUMENTS

| | | |
|---|---|---|
| 2 602 596 | 2/1988 | (FR) . |
| 1 173 565 | 12/1969 | (GB) . |

OTHER PUBLICATIONS

"Film Printer Balancing Kit." *Research Disclosure*. No. 325. May 1, 1991. XP000229715.

* cited by examiner

*Primary Examiner*—Hoa Van Le
(74) *Attorney, Agent, or Firm*—Merchant & Gould P.C.

(57) ABSTRACT

A method has been found for producing a set of exposed photographic color negatives for use in calibrating a developing and a printing machine system for making photographic color prints, wherein
 all the exposures are carried out to the same multicolored object which also contains a grey reference part while using the same type of photosensitive film material, and
 the exposures comprise at least 8 normal (N) exposures, at least 4 over (O) exposures and at least 4 under (U) exposures, at a ratio of the number of N/O/U exposures of 5/(2-3)/(2-3), and include, in the order given, each of the four sequences NN/NN; NN/OO; NN/UU; and UU/OO, or NN/NN, NN/UU; NN/OO and OO/UU. The set of exposed negatives thus produced is used in a method for calibrating a developing and a printing machine system for making photographic color prints.

11 Claims, 1 Drawing Sheet

Figure 1:
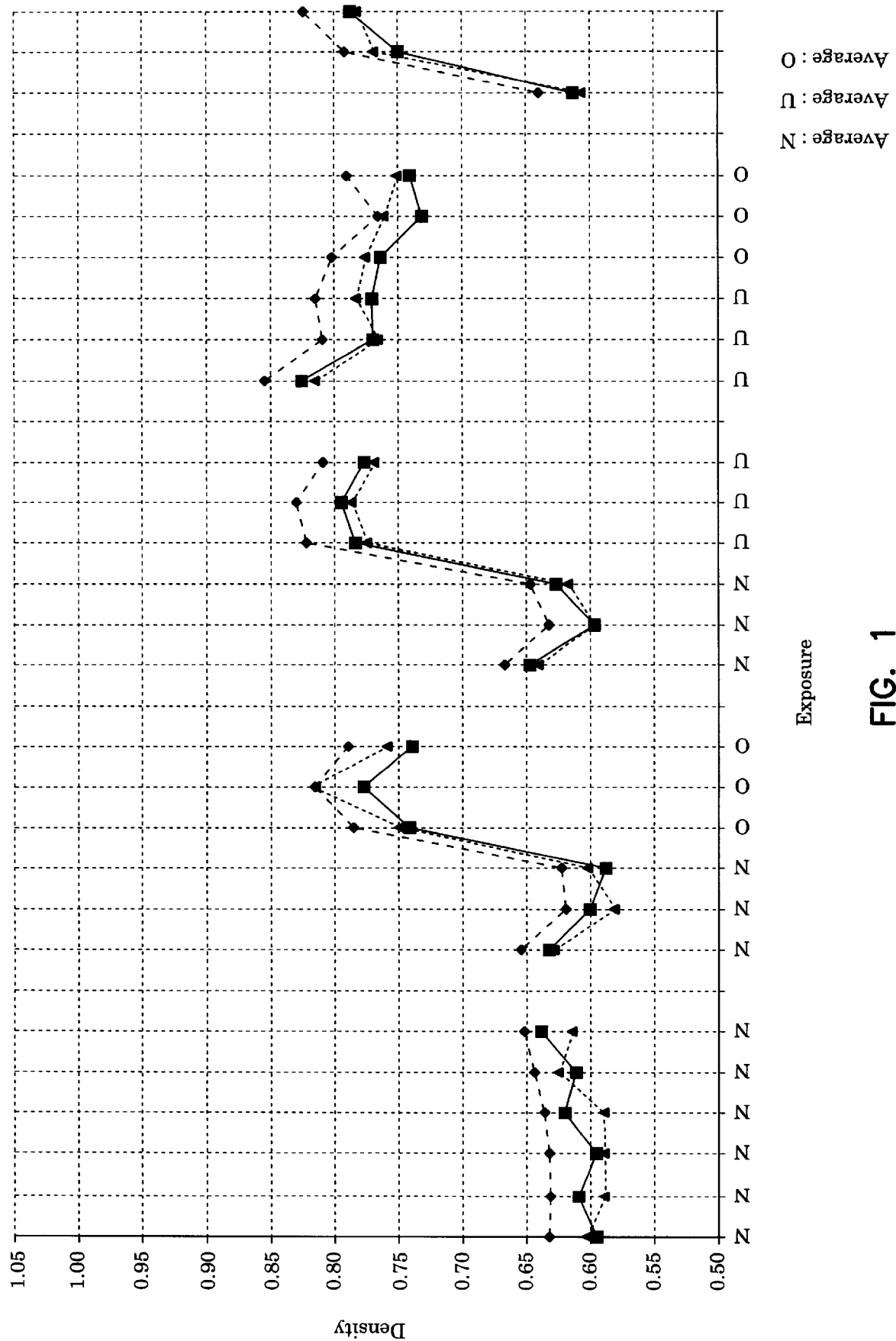

METHOD FOR PRODUCING A SET OF EXPOSED PHOTOGRAPHIC COLOUR NEGATIVES AND THE USE OF SAID SET OF NEGATIVES IN A METHOD FOR CALIBRATING A DEVELOPING AND A PRINTING MACHINE SYSTEM FOR MAKING PHOTOGRAPHIC COLOUR PRINTS

The present invention relates to a method for producing a set of exposed photographic colour negatives suitable for use in calibrating a developing and a printing machine system for making photographic colour prints. The present invention also relates to the use of the set of exposed negatives thus produced for calibrating a developing and a printing machine system for making photographic colour prints.

The calibration of a developing/printing machine system is an ever lasting problem in the art of making photographic colour prints. As a matter of fact, all the calibration methods presently used are unsatisfactory, mainly in that they cannot avoid that substantial differences occur in the quality of the photographic colour prints produced.

The MSP printing machines commercially used are usually supplied with three calibration negative film strips which have been exposed and developed by the manufacturer. The exposures are carried out at standardised levels of normal (N), over (O) and under (U) exposure. The specific development conditions at the photolaboratory of the customer are not taken into account and the reproducibility of the printing quality is poor. Even shortly after the printing machine has been calibrated the printing quality can be unsatisfactory.

An alternative calibration technique is provided by the colour kits of Kodak and Fuji which comprise exposed negative strips for calibrating the developer machine as well as the printing machine of a photolaboratory. The exposed negative strips contain a grey reference circle which has been introduced into the negative afterwards by means of a digitised technique. The difference between the grey colour in the original negative and the grey colour of the digitised reference circle will result in that a good reproducibility of the printing quality cannot be obtained.

Finally, several attempts have been made in order to calibrate printing machines by means of negative films which have been submitted to arbitrarily chosen exposure conditions. However, large density fluctuations in the printing quality have been experienced.

It is a first object of the present invention to provide a method for producing a set of exposed photographic colour negatives which can be used in a method for calibrating a developing and a printing machine system for making photographic colour prints.

According to a further object the present invention provides a simple and reliable method for calibrating a developing and a printing machine system for making photographic colour prints in such a manner that photographic prints having a substantially equal desired colour quality can be made.

According to a still further object of the present invention said substantially equal desired colour quality can be obtained irrespective of the nature or origin of either the exposed negative film provided by the photographer or the photosensitive printing paper used.

The present invention provides a method for producing a set of exposed photographic colour negatives for use in calibrating a developing and a printing machine system for making photographic colour prints, wherein all the exposures are carried out to the same multicoloured object which also contains a grey reference part while using the same type of photosensitive film material, and the exposures comprise at least 8 normal (N) exposures, at least 4 over (O) exposures and at least 4 under (U) exposures, at a ratio of the number of N/O/U exposures of 5/(2-3)/(2-3), and include, in the order given, each of the four sequences NN/NN; NN/OO; NN/UU; and UU/OO, or NN/NN, NN/UU; NN/OO, and OO/UU.

The set of exposed but not yet developed colour negatives produced according to the present invention is supplied to the photolaboratory—hereinafter also called the customer—to be calibrated in accordance with a further aspect of the present invention. The set of colour negatives is produced by making a number of exposures on the same type of photosensitive film material. The multicoloured object used for all the exposures is the same and is a composition encompassing substantially the whole range of the visible spectrum in such a ratio that each of the major parts of the spectrum broadly, such as the cyan, the magenta and the yellow part thereof, is present in a substantial equal proportion. Or, to put it differently, the total colour composition is well balanced and represents an average multicoloured object. This can be achieved by constituting a multicoloured object comprising a number of differently coloured articles. A grey reference part as well known in the art, e.g. in the form of a colour frame or a colour circle, also forms part of the multicoloured object and serves for measuring the partial densities after the colour prints have been produced.

It has been found that the manner in which the exposures of the photosensitive film material are carried out is of decisive importance for obtaining an excellent calibration resulting in that colour prints having a desired substantially equal good quality can be produced. As a matter of fact, it has been established experimentally that a minimum number of N exposures, O exposures and U exposures, as set out above, has to be carried out, while the ratio between the number of N/O/U exposures should amount to 5/(2-3)/(2-3) and most preferably is 2/1/1.

Moreover, the several exposures should include four sequences, also as set out above. As said before, these exposure conditions have been established experimentally and aim at obtaining an optimal calibration, while the fact that a negative film which has been exposed by an amateur photographer in average also contains a number of O and U exposures, in addition to the N exposures, has been taken into account as well.

Furthermore, although the levels of the O exposures and of the U exposures for producing part of the colour negatives can be the same, e.g. can be at least (N+1) stop and at least (N−1) stop respectively, it has been found that the best results, in terms of the desired substantially equal quality of the photographic colour prints to be produced, can be obtained when the said levels amount to (N+3) stops and (N−2) stops respectively.

According to a preferred embodiment each sequence of exposures comprises the same number of exposures and when different types of exposures form part of a sequence, such as in case of NN/OO, the number of exposures of one type is equal to the number of exposures of the other type and the exposures of the same type are carried out consecutively.

According to the most preferred embodiment the exposures for producing the colour negatives comprise, in the order given, the four sequences NNN/NNN; NNN/OOO; NNN/UUU; and UUU/OO.

Generally all the exposures for producing the colour negatives are carried out shortly after each other and, although any type of light, such as daylight can be used for exposing the photosensitive film material used for producing the colour negatives, studio exposing conditions using flash light are preferred because they can provide a high level of equality as far as the nature of the light, and in particular the colour contrast is concerned. When studio exposing conditions using flash light are used indeed, it is evident, as is well known to a person skilled in the art, that a minimum time between successive exposures should be taken into account in order to permit the stabilisation of the exposure unit, e.g. between 0.5 and 3 seconds depending on whether intensity of the flash light has been lower or higher.

The present invention also relates to method for calibrating a developing and a printing machine system for making photographic colour prints comprising developing a set of exposed photographic colour negatives produced as described hereinabove, making photographic colour prints from the developed negatives thus obtained, measuring the cyan, magenta and yellow partial densities at the grey reference part of each colour print, calculating from the values thus measured the average densities cyan N, magenta N and yellow N; the average densities cyan O, magenta O and yellow O; and the average densities cyan U, magenta U and yellow U, and calibrating the printing machine starting from the calculated average densities by adjusting it to obtain a desired colour print quality at the choice of the operator.

Generally the set of exposed colour negatives is provided to the customer in the form of a film strip. The customer will then develop the film strip while using his standard conditions as to the composition and temperature of the developer bath, the development time and the replenishment rate of fresh developer solution. It is important that the exposed colour negatives are developed before their properties risk to become changed due to ageing, which would affect their usefulness in the inventive calibration method. Therefore, it is recommendable to develop them within at most one month and preferably within two weeks after they have been produced.

The exposed and developed colour negatives are then used for producing colour prints in the customer's printing machine to be calibrated, while using the standard conditions for the usual operation of the machine prevailing there with respect to the composition and temperature of the developer bath, the development time and the drying of the prints.

Then the cyan, magenta and yellow partial densities at the grey reference part of each colour print are measured and from the values thus measured the average densities cyan N, magenta N and yellow N; the average densities cyan O, magenta O and yellow O; and the average densities cyan U, magenta U and yellow U are calculated. The procedures for measuring the partial densities and for calculating average density values therefrom belong to the standard operations in the art of producing photographic colour prints in a photolaboratory and therefore do not have to be discussed in detail here.

Starting from the calculated average densities obtained as discussed above, the printing machine is calibrated by adjusting it to obtain a desired print quality at the choice of the operator. This means that it belongs to the general knowledge and skill of the operator and further, that it depends on the type of colour depth and colour balance which he wishes to offer to his clients or which is desired by them, which specific reference densities are used when the printing machine is calibrated starting from the calculated average densities obtained as described above.

More specifically, it has been established experimentally that a good overall colour quality of the prints to be produced can be obtained when the printing machine is calibrated by adjusting it to the following reference density ranges:

for cyan O and for cyan U: 0.10–0.16 and 0.14–0.20 respectively higher than the chosen cyan N reference density;

for magenta O and for magenta U: 0.12–0.18 and 0.15–0.21 respectively higher than the chosen magenta N reference density; and for yellow O and for yellow U: 0.13–0.19 and 0.14–0.20 respectively higher than the chosen yellow N reference density.

Still more preferred the printing machine is calibrated by adjusting it to the following reference densities +/–0.01:

for cyan O and for cyan U: 0.13 and 0.17 respectively higher than the chosen cyan N reference density;

for magenta O and for magenta U: 0.15 and 0.18 respectively higher than the chosen magenta N reference density; and for yellow O and for yellow U: 0.16 and 0.17 respectively higher than the chosen yellow N reference density.

It is further observed, that in calibrating the printing machine as described in the preceding two paragraphs each of the cyan, magenta and yellow N reference densities will usually be chosen within the density range of 0.57–0.68. Within this range the cyan N reference density is preferably chosen at 0.62+/–0.02, the magenta N reference density is preferably chosen at 0.64+/–0.02, and the yellow N reference density is preferably chosen at 0.61+/–0.02.

It is observed that the calibration of a developer and a printing machine system according to the present invention results in that the printing machine will produce photographic colour prints having a substantially equal desired colour quality for a long time, irrespective of the nature or origin of either the exposed negative film or the photosensitive printing paper to be used. This is a considerable advantage which is highly desirable in the art of photography, since up to now it was not possible to guarantee a substantial equal quality of photographic colour prints and reprints.

After the developing and printing machines have been calibrated according to the present invention they can be operated for a long time, as said, e.g. for producing many thousands of colour prints of substantially equal good quality, provided the operating conditions are kept substantially the same. This means that the developer bath remains substantially unchanged which can be achieved by carrying out replenishments according to need, and that the bath temperature and also the development time are kept substantially constant. When a substantial change of the operation conditions occurs, of course, the developing and printing machines have to be calibrated over again by means of a new set of exposed photographic colour negatives which has been produced according to the method of the present invention as described in detail herein.

As said before, the calibration of a developing and a printing machine system according to the present invention, and preferably while adjusting it within the reference density ranges and to the reference densities specified above, results in that the printing machine will produce colour prints having a substantially equal desired good colour quality. This means a quality which complies with what the applicant considers as a desired well balanced colour quality.

The reference density ranges and the preferred reference density values given hereinabove have been established experimentally by the applicant in his own photolaboratory and are considered by the applicant as the desired well balanced colour quality. The method according to which said ranges and values have been established will be described below.

On a commercial Fuji colour negative film of 200 ASA a number of exposures were made of a multicoloured object which also contained a grey reference part, as described hereinabove. The exposures were made under studio exposing conditions using flash light. In total 24 exposures were made in the following given order: NNN/NNN; NNN/OOO; NNN/UUU; and UUU/OOO, wherein the level of the O exposures was N+3 and the level of the U exposures was N−2. Then the negative film was developed in 195 seconds at 28° C. in the negative developing machine of the type Hostend LB using a running Fuji C-41-developer bath.

The developed colour negatives were then printed in a printing machine of the type Agfa MSP while using a 35 msec exposure. The paper developing machine was operated at 38° C. and contained a running Fuji RA-4developer bath. The development time was 45 seconds.

Then the cyan, magenta and yellow partial densities at the grey reference part of each developed and dried colour print was measured. The thus measured values are depicted in the accompanying FIGURE, and the average densities cyan N, magenta N and yellow N; the average densities cyan O, magenta O and yellow O; and the average densities cyan U, magenta U and yellow U calculated therefrom are represented in the right-hand side graph on the FIGURE. The values of the latter graph are the reference densities considered by the applicant as providing the optimized desired colour quality. The data with respect to reference density ranges and reference densities, specified hereinabove, are derived from the said right-hand side graph.

The set of exposed photographic colour negatives, preferably 24 negatives, produced as described hereinbefore, and the data represented in the right-hand side graph on the FIGURE accompanying the present specification constitute the tools provided to the customer in order to enable him to practice the present invention, i.e. to calibrate his developing and printing machine system according to the method of the present invention.

What is claimed is:

1. Method for producing a set of exposed photographic colour negatives for use in calibrating a developing and a printing machine system for making photographic colour prints, wherein
    all the exposures are carried out to the same multicoloured object which also contains a grey reference part while using the same type of photosensitive film material, and
    the exposures comprise at least 8 normal (N) exposures, at least 4 over (O) exposures and at least 4 under (U) exposures, at a ratio of the number of N/O/U exposures of 5/(2-3)/(2-3), and include, in the given order, each of the four sequences NN/NN; NN/OO; NN/UU; and UU/OO, or NN/NN; NN/UU; NN/OO; and OO/UU.

2. Method according to claim 1 wherein the level of the over (O) exposures for producing part of the colour negatives is (N+3) stops and the level of the under (U) exposures for producing part of the colour negatives is (N−2) stops.

3. Method according to claim 1 wherein each sequence comprises the same number of exposures and when different types of exposures form part of a sequence, such as in the case of NN/OO, the number of exposures of one type is equal to the number of exposures of the other type and the exposures of the same type are carried out consecutively.

4. Method according to claim 1 wherein the ratio of the number of N/O/U exposures is 2/1/1.

5. Method according to claim 1 wherein the exposures comprise, in the order given, the four sequences NNN/NNN; NNN/OOO; NNN/UUU; and UUU/OOO.

6. Method according to claim 1 wherein the exposures are carried out under studio exposing conditions using flash light.

7. Method for calibrating a developing and a printing machine system for making photographic colour prints comprising developing a set of exposed photographic colour negatives produced according to the method of claim 1, making photographic colour prints from the developed negatives thus obtained, measuring the cyan, magenta and yellow partial densities at the grey reference part of each colour print, calculating from the values thus measured the average densities cyan N, magenta N and yellow N; the average densities cyan O, magenta O and yellow O; and the average densities cyan U, magenta U and yellow U, and calibrating the printing machine starting from the calculated average densities by adjusting it to obtain a desired colour print quality at the choice of the operator.

8. Method according to claim 7 wherein the printing machine is calibrated by adjusting it to the following reference density ranges:
    for cyan O and for cyan U: 0.10–0.16 and 0.14–0.20 respectively higher than the chosen cyan N reference density;
    for magenta O and for magenta U: 0.12–0.18 and 0.15–0.21 respectively higher than the chosen magenta N reference density; and
    for yellow O and for yellow U: 0.13–0.19 and 0.14–0.20 respectively higher than the chosen yellow N reference density.

9. Method according to claim 8 wherein the printing machine is calibrated by adjusting it to the following reference densities +/−0.01:
    for cyan O and for cyan U: 0.13 and 0.17 respectively higher than the chosen cyan N reference density;
    for magenta O and for magenta U: 0.15 and 0.18 respectively higher than the chosen magenta N reference density; and
    for yellow O and for yellow U: 0.16 and 0.17 respectively higher than the chosen yellow N reference density.

10. Method according to claim 7 wherein each of the cyan, magenta and yellow N reference densities is chosen within the density range of 0.57–0.68.

11. Method according to claim 7 wherein the cyan N reference density is chosen at 0.62+/−0.02, the magenta N reference density is chosen at 0.64+/−0.02, and the yellow N reference density is chosen at 0.61+/−0.02.

* * * * *